United States Patent Office 3,139,438
Patented June 30, 1964

3,139,438
COPPER PHTHALOCYANINE DYESTUFFS CONTAINING (3' - CHLORO - 2' - HYDROXYPROPOXYPHENYL)SULFAMYL GROUPS
Gerald Booth and Frank Hall, Manchester, England, assignors to Imperial Chemical Industries Limited, London, England, a corporation of Great Britain
No Drawing. Filed Jan. 16, 1961, Ser. No. 82,737
Claims priority, application Great Britain May 19, 1958
1 Claim. (Cl. 260—314.5)

This invention relates to new dyestuffs and more particularly it relates to new water-soluble dyestuffs which are valuable for colouring textile materials, in particular cellulose textile materials.

According to the invention there are provided new water-soluble dyestuffs which contain at least one group of the formula:

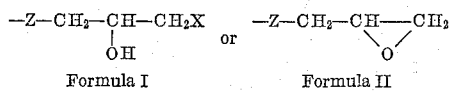

wherein Z is selected from —O—, —S— and —SO$_2$— and X is a halogen atom selected from a bromine and preferably a chlorine atom. It is however preferred that the group of Formula I or II present in the dyestuffs is the 3-chloro-2-hydroxypropoxy group.

Each of the groups of Formulae I and II is attached to a carbon atom of an aryl radical, which is preferably a phenyl or a naphthyl radical, present in the dyestuff, or alternatively each of the said groups is attached to a carbon atom of an alkyl radical, which is preferably a lower alkyl radical such as a methyl or ethyl radical, which is directly attached to a carbon atom of an aryl radical present in the dyestuff or which is attached to the aryl radical through a bridging atom or group. As examples of such bridging atoms and groups there may be mentioned —O—, —S—, —SO$_2$—, —NH—,

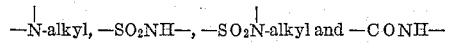

The water-soluble dyestuffs may be members of any of the known series of dyestuffs but preferably they are members of the azo, especially monoazo, series, anthraquinone series and above all the phthalocyanine series. As examples of groups which are present in the dyestuffs to render them water-soluble there may be mentioned sulphonamide, alkylsulphone, carboxylic acid and preferably sulphonic acid groups.

If desired the dyestuffs, particularly in the case of dyestuffs of the azo and phthalocyanine series, may contain coordinately bound metal, such as coordinately bound copper, chromium, nickel and cobalt.

The new water-soluble dyestuffs of the invention may be obtained by methods known from the art or used in practice for the synthesis of water-soluble dyestuffs by reacting together dyestuff intermediates, at least one of which contains a group of Formula I or II, as hereinbefore defined, and at least one of the said intermediates contains a water-solubilising group.

Thus for example water-soluble azo dyestuffs containing at least one group of Formula I or II may be obtained by diazotising a primary aromatic amine, which may be an aminoazo compound, and coupling the diazo compound so obtained with a coupling component, the primary aromatic amine and/or the coupling component containing at least one group of Formula I or II, and the primary aromatic amine and/or the coupling component containing at least one water-solubilising group.

The primary aromatic amines used to obtain the said azo dyestuffs are preferably primary amines of the benzene or naphthalene series which optionally contain an aminoazo group. The said amines can be divided into those which contain at least one group of Formula I or II and those amines which do not contain one of the said groups.

As examples of amines which contain at least one group of Formula I or II there may be mentioned 2-, 3- or 4-(3'-chloro-2'-hydroxypropoxy)aniline, 2-, 3- or 4-(3'-bromo-2'-hydroxypropoxy)aniline, 2-, 3- or 4-(3'-chloro-2'-hydroxypropylmercapto)aniline, 2-, 3- or 4-(3'-chloro-2'-hydroxypropylsulphonyl)aniline, 2-(3'-chloro-2'-hydroxypropoxy)aniline-5-sulphonic acid, 2-methoxy-5-methyl-4-[4'-(3''-chloro - 2'' - hydroxypropoxy)phenylazo]aniline, 2:5-dimethoxy-4-[(3''-chloro-2''-hydroxypropoxy)phenylazo]aniline and 1-amino-4-[(3''-chloro-2''-hydroxypropoxy)phenylazo]naphthalene-5-, -6- or -7-sulphonic acid.

As examples of amines which do not contain one of the said groups there may be mentioned aniline and substituted derivatives thereof such as 2-, 3- or 4-toluidine, aniline-2-, -3- or -4-sulphonic acid, aniline-2:5-disulphonic acid, anthranilic acid, 4-aminoazobenzenedisulphonic acid, 4-nitroaniline-2-sulphonic acid, 2:5-dimethoxyaniline and cresidine, and 1- or 2-naphthylamines and substituted derivatives thereof such as 1-naphthylamine-5-, -6- or -7-sulphonic acid, 2-naphthylamine-3:6- or -6:8-disulphonic acid, 1-naphthylamine-3:6:8-trisulphonic acid and 4-(2':5'-disulphophenylazo)-1-naphthylamine-5-, -6- or -7-sulphonic acid.

The coupling components used to obtain the said azo dyestuffs may be members of any of the known series of coupling components but preferably they are coupling components of the acylacetarylide, phenol, naphthol, 5-aminopyrazole in particular 1-aryl-5-aminopyrazole, and 5-pyrazolone in particular 1-aryl-5-pyrazolone series.

As specific examples of coupling components there may be mentioned acylacetarylides such as acetoacetanilide, acetoacetanilide-3- or -4-sulphonic acid, 4-(3'-chloro-2'-hydroxypropoxy)acetoacetanilide and 3-(3'-chloro-2'-hydroxypropylsulphonyl)acetoacetanilide; phenols such as p-cresol and 5:6:7:8-tetrahydro-2-naphthol, naphthols such as 2-naphthol, 2-naphthol-6- or -8-sulphonic acid, 2-amino-5-naphthol-7-sulphonic acid and N-acyl, N-alkyl and N-aryl derivatives thereof, 2-amino-8-naphthol-6-sulphonic acid and N-acyl, N-alkyl and N-aryl derivatives thereof, 1-amino-8-naphthol-3:6- or -4:6-disulphonic acid and N-acyl, N-alkyl and N-aryl derivatives thereof, 7-(2':3'-epoxypropoxy) - 2 - naphthol, 7-(3'-chloro-2'-hydroxypropoxy)-2-naphthol, 2-naphthol-6-sulphon-N-[4'-(3''-chloro-2'' - hydroxypropoxy)phenyl]amide and 6-(2':3'-epoxypropylmercapto)-2-naphthol; 5-aminopyrazoles in particular 1-aryl-5-aminopyrazoles such as 1-phenyl-3-methyl-5-aminopyrazole; and 5-pyrazolones such as 1:3-dimethyl-5-pyrazolone and more especially 1-aryl-5-pyrazolones such as 1-phenyl-3-methyl-5-pyrazolone, 1-(2'- 3'- or 4'-sulphophenyl)-3-methyl-5-pyrazolone, 1-(2'-, 3'- or 4'-methylphenyl)-3-methyl-5-pyrazolone, 1-[3'- or 4'-(3''-chloro-2''-hydroxypropoxy)phenyl]-3-methyl-5-pyrazolone, 1-[3'- or 4'-(3''-chloro-2''-hydroxypropylsulphonyl)phenyl]-3-methyl-5-pyrazolone and 1-(3'- or 4'-sulphamylphenyl)-3-methyl-5-pyrazolone.

The new dyestuffs of the invention which contain at least one group of Formula I may also be obtained by treating a water-soluble dyestuff compound which contains at least one group of the formula: —Z—M wherein Z has the meaning stated above and M stands for a hydrogen atom or an alkali metal such as sodium or potassium, with epichlorohydrin or with epibromohydrin, or with an alkali and 1:3-dichloro-2-propanol or 1:3-dibromo-2-propanol. As examples of water-soluble dyestuff compounds containing at least one —Z—M group there may be mentioned 3-carboxy - 4 - hydroxyazobenzene-4'-sulphonic acid, 3-carboxy - 4 - mercaptoazobenzene-4'-sulphonic acid, 1-amino-4-(4'-hydroxyanilino)anthraquinone-2:5-disulphonic acid, copper phthalocyanine sulphonic acids which also contain N-hydroxyethylsulphamyl, mercapto, mercaptomethyl(—CH$_2$.SH), N-(4-hydroxy-3-sulphophenyl)sulphamyl, N - (3-hydroxy-4-carboxyphenyl)sulphamyl or sulphinic acid groups.

Amines containing a group of Formula I or II can also be used as intermediates for the synthesis of dyestuffs in series other than the azo series, for example by reacting the said amines with dyestuffs containing sulphonchloride or carbonylchloride groups, for example the phthalocyanines of British specification No. 515,637 or amino- or substituted amino-anthraquinones containing 2 or more sulphonchloride groups.

The proportion of amine used may be varied to obtain dyestuffs containing different proportions of sulphonamide groups and sulphonic acid groups, but, as will be apparent, it is essential that at least one molecular proportion of the amine is used for each molecular proportion of the dyestuff containing sulphonchloride groups. When the dyestuff containing sulphonchloride groups also contains sulphonic acid or other water-solubilising groups, an excess of amine may be used over the amount necessary to react completely with the sulphonchloride groups present. When the dyestuff containing sulphonchloride groups does not contain any water-solubilising group, the proportion of amine used should be insufficient to cause complete conversion of all the sulphonchloride groups to sulphonamide groups. Any sulphonchloride groups which do not react with the amine may be hydrolysed by carrying out the process in aqueous medium or by after-treating the dyestuff containing both sulphonchloride and sulphonamide groups in a weakly alkaline aqueous solution; aqueous pyridine at a temperature of about 25° C. is particularly suitable for this hydrolysis step. The hydrochloric acid liberated during the reaction may be neutralised by adding an acid-binding agent, for example, by adding a salt of a weak acid such as sodium bicarbonate, sodium carbonate or sodium acetate.

The above amines may also be reacted with other dyestuff intermediates containing reactive halogen atoms, for example, 1-amino - 4 - bromoanthraquinone-2-sulphonic acid to give blue dyestuffs, and o-chloronitrobenzene and its sulphonic acid and similar compounds to give greenish-yellow nitro dyestuffs.

One preferred class of the new dyestuffs are those represented by the formula:

wherein Q represents a radical containing from 1 to 3 sulphonic acid groups, the said radical being selected from the group consisting of N-naphthylazo, N-naphthylazopyrazolonyl, N-anthraquinonylamino and N-copper phthalocyanine sulphamyl radicals. Above all are preferred the dyestuffs of the copper phythalocyanine series containing from 2 to 3 sulphonic acid groups and from 2 to 1 (3'-chloro-2'-hydroxypropoxyphenyl)-sulphamyl groups attached to the benz rings of the phthalocyanine nucleus.

Such phthalocyanine dyestuffs may be obtained by reacting copper phthalocyanine sulphonchlorides, which optionally contain one or more sulphonic acid groups, with a (3'-chloro-2'-hydroxypropoxy)aniline, provided that when starting from a copper phthalocyanine sulphonchloride which is free from sulphonic acid groups the reaction is carried out under such conditions that at least one sulphonchloride group is hydrolysed to a sulphonic acid group.

Copper phthalocyanine sulphonchlorides may themselves be obtained by treating copper phthalocyanine or copper phthalocyanine sulphonic acids with chlorosulphonic acid, if necessary in the presence of carbon tetrachloride or an acid halide such as thionyl chloride, sulphuryl chloride, phosphorus pentachloride, phosphorus oxychloride and phopshorus trichloride, for example as described in British specification Nos. 708,543, 784,843 and 785,629 and in United States Patent No. 2,219,330.

A second preferred class of the dyestuffs of the invention are the new metallised azo dyestuffs, which in the form of the free acids, are represented by the formula:

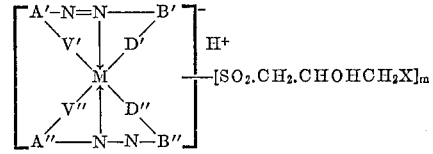

wherein A' and A'' each represent substituted or unsubstituted arylene radicals and may be the same or different, B' and B'' each represent the residues of substituted or unsubstituted coupling components which couple in the ortho or vicinal positions to D' and D'' respectively and B' and B'' may be the same or different, V' and V'' each represent —O— or —COO— and may be the same or different, D' and D'' each represent —O— or —NH— and may be the same or different, M represents a chromium or cobalt atom, X represents a chlorine or a bromine atom and m represents 1, 2, 3 or 4, provided that each of the —SO$_2$CH$_2$CHOH.CH$_2$X groups is attached directly to a carbon atom present in A', A'', B' or B'', and that A', A'', B' and B'' are free from sulphonic and carboxylic acid groups.

As examples of the unsubstituted arylene radicals represented by A' and B'' there may be mentioned phenylene and naphthylene radicals and as examples of substituents which may be present in these arylene radicals and which may also be present in the residues of the coupling components represented by B' and B'' there may be mentioned alkyl for example methyl, alkoxy for example methoxy, chlorine, bromine, nitro, alkylsulphonyl for example methylsulphonyl and ethylsulphonyl, acylamino for example acetylamino, benzoylamino, carbomethoxyamino and carboethoxyamino, sulphamyl, N-substituted sulphamyl for example N:N-dimethylsulphamyl, N - ethylsulphamyl, N - benzoylsulphamyl and N-phenylsulphamyl.

The residues of the coupling components represented by B' and B'' may be the residues of any coupling components which couple in an ortho or vicinal position to the metallisable groups —D'H and D''H respectively, wherein D' and D'' have the meanings stated above, but B' and B'' are preferably the residues of coupling components of the phenol, naphthol, acetoacetarylide and 5-pyrazolone in particular the 1-aryl-5-pyrazolone series.

The metallised azo dyestuffs of this preferred class may be obtained by treating 1 or 2 different metallisable azo compounds of the formula:

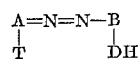

wherein A represents a substituted or unsubstituted phenylene or naphthalene radical, B represents the residue of a coupling component which couples in the ortho or vicinal position to D, D represents —O—, —NH— or —NAlkyl— and T represents a hydroxy, carboxy or alkoxy group which is attached to A in the ortho position to the azo link, with an agent or agents yielding chromium or cobalt, the metallisable azo compound or compounds being so chosen that the resulting metallised azo dyestuff contains 1, 2, 3 or 4 groups of the formula: —SO$_2$CH$_2$CHOH.CH$_2$X, wherein X has the meaning stated above, and is free from sulphonic and carboxylic acid groups.

The treatment of the metallisable azo compound or compounds with the agent or agents yielding chromium or cobalt is carried out under mildly acid, neutral or alkaline conditions the amount of the agent or agents yielding chromium or cobalt being such that corresponds to more than 0.5 atomic proportion, and preferably not more than 1.5 atomic proportions, of chromium or cobalt for each molecular proportion of the said metallisable azo compound or compounds.

As examples of the agents yielding chromium or cobalt which may be used in the process of the invention there may be mentioned chromium or cobalt halides, for example the chlorides or fluorides, chromium or cobalt salts of aliphatic carboxylic acids, for example formic or acetic acid and mixtures of chromium or cobalt salts with alkali metal salts of aliphatic hydroxycarboxylic acids, for example of tartaric acid, chromium complexes of aromatic ortho-hydroxy carboxylic acids, for example salicylic acid.

The treatment of the said metallisable azo compound or compounds with the agent or agents yielding chromium or cobalt is carried out under mildly acid, neutral or alkaline conditions. The treatment may be conveniently carried out at elevated temperature under atmospheric pressures in aqueous medium preferably in the presence of an organic liquid, for example ethyl alcohol, n-butyl alcohol, β-ethoxyethanol, ethylene glycol or acetic acid. The formation of the metal complex may be facilitated by adding a wetting or dispersing agent to the reaction mixture. Upon completion of the reaction the metallised azo dyestuff is separated and, if desired in the case of those metallised azo dyestuffs which are soluble in water, may be purified by reprecipitating it, in the form of a salt from an aqueous alkaline solution, for example an aqueous solution rendered alkaline by the addition of sodium carbonate, sodium hydroxide, sodium phosphate or ammonium hydroxide.

The metallisable azo compounds may themselves be obtained by diazotising an amine of the formula:

wherein A and T have the meanings stated above and T is in the ortho position to the —NH$_2$ group and coupling the diazo compounds with a coupling component of the formula:

which couples in the ortho or vicinal position to the metallisable group —DH, the amine and coupling component being so chosen that the resulting metallisable azo compounds each contain 0, 1 or 2 groups of the formula: —SO$_2$.CH$_2$CHOHCH$_2$X wherein X has the meaning stated above, and are free from sulphonic and carboxylic acid groups, other than a carboxylic acid group represented by T.

As examples of amines which may be used to obtain the metallisable azo compounds there may be mentioned:

o-aminophenol,
4-chloro-2-aminophenol,
6-chloro-2-aminophenol,
4-, 5- or 6-nitro-2-aminophenol,
4:6-dinitro-2-aminophenol,
4-chloro-5-nitro-2-aminophenol,
2-aminophenol-4-sulphonamide,
2-aminophenol-4-sulphon-N-β-hydroxyethylamide,
2-aminophenol-4-sulphondimethylamide,
2-aminophenol-4-sulphonanilide,
2-aminophenol-4-methylsulphone,
2-aminophenol-4-ethylsulphone,
2-amino-4-β-hydroxyethylsulphone,
Anthranilic acid,
4-chloroanthranilic acid,
5-nitroanthranilic acid,
4-sulphamylanthranilic acid,
4-methylsulphonyl-anthranilic acid,
4-methoxy-2-aminophenol,
4-methyl-2-aminophenol,
2-aminophenol-4-sulphonmorpholide,
o-anisidine,
4-, 5- or 6-nitro-2-anisidine,
4-, 5- or 6-chloro-2-anisidine,
2-amino-4-(3'-chloro-2-hydroxypropylsulphonyl) anisole,
4- or 5-(3' - chloro - 2' - hydroxypropylsulphonyl) - anthranilic acid, and
4-(3'-chloro-2'-hydroxypropylsulphonyl)-5-methyl-2-methoxyaniline.

Those amines of the formula:

as hereinbefore defined, which also contain 1 or 2 groups of the formula: —SO$_2$.CH$_2$.CHOH.CH$_2$X wherein X has the meaning stated above, may be obtained by treating the corresponding amine, or N-acetyl derivative thereof, containing 1 or 2 sulphinic acid groups with an epihalogenohydrin in the presence of a buffer or pH between 6.0 and 8.0 and subsequently removing the N-acetyl group when present by an acid hydrolysis.

As examples of coupling components which may be used to obtain the metallisable azo compounds there may be mentioned pyrazolones such as 1-phenyl-3-methyl-5-pyrazolone,
1-(2'- 3'- or 4'-methylphenyl)-3-methyl-5-pyrazolone,
1-(2'-, 3'- or 4'-chlorophenyl)-3-methyl-5-pyrazolone,
1-[3'-(3''-chloro-2''-hydroxypropylsulphonyl)phenyl]-3-methyl-5-pyrazolone,
1-[4'-(3''-chloro-2''-hydroxypropylsulphonyl)phenyl]-3-methyl-5-pyrazolone,
1-(3-, or 4'-sulphamylphenyl)-3-methyl-5-pyrazolone,
3-methyl-5-pyrazolone,
1-(2'-, 3'- or 4'-nitrophenyl)-3-methyl-5-pyrazolone,
1-(3'- or 4' - N-β-hydroxyethylsulphamylphenyl)-3-methyl-5-pyrazolone and
1-2'-, 3'- or 4'-β-hydroxyethylsulphonylphenyl)-3-methyl-5-pyrazolone, Naphthols such as 1-acetylamino-7-naphthol,
1-propionylamino-7-naphthol,
1-benzenesulphonylamino-7-naphthol,
1-carbomethoxyamino-7-naphthol,
1-carboethoxyamino-7-naphthol,
2-naphthol,
5-chloro-1-naphthol,
5:8-dichloro-1-naphthol,
2-naphthol-6-sulphon-N-β-hydroxyethylamide,
2-naphthol-6-β-hydroxyethyl sulphone,
4-acetyl-1-naphthol,
2-naphthol-6-sulphonanilide,
2-naphthol-6-sulphon-N-(4'-N-β-hydroxyethylsulphamylphenyl)amide,
6-acetyl-2-naphthol,
6-(3'-chloro-2'-hydroxypropylsulphonyl)-2-naphthol,
1-naphthol-3-sulphonamide,
2-naphthol-6-sulphonamide and
1-naphthol-5-sulphonamide, acylacetoarylides such as acetoacetanilide and 3- or 4-(3'-chloro-2'-hydroxypropylsulphonyl)acetoacetanilide, phenols such as 3:4-dimethylphenol, p-cresol, 2- or 3-acetylamino - 4 - methylphenol, 2-hydroxy-5:6:7:8-tetrahydronaphthalene and 2 - hydroxy - 3-sulphamyl-5:6:7:8-tetrahydronaphthalene, 2:4-dihydroxyquinoline, and amine coupling components such as 2-naphthylamine and 2-naphthylamine-6-sulphonamide.

Those coupling components of the formula:

as hereinbefore defined, which also contain 1 or 2 groups of the formula: —SO$_2$.CH$_2$CHOH.CH$_2$X wherein X has the meaning stated above and —B—DH represents the residue of a 5-pyrazolone may be obtained by diazotising the corresponding amine containing 1 or 2 groups of the formula: —SO₂.CH₂CHOH.CH₂X, reducing the diazo compound so obtained to the hydrazine, condensing the hydrazine with an acylacetic ester such as acetoacetic ester and finally ring closing to form the 5-pyrazolone.

Those coupling components of the formula:

as hereinbefore defined, which also contain 1 or 2 groups of the formula: —SO₂.CH₂CHOH.CH₂X and —B—DH represents the residue of an acetoacetarylide may be obtained by condensing the corresponding amine containing 1 or 2 groups of the formula: —SO₂.CH₂CHOH.CH₂X with diketene.

Those coupling components of the formula:

as hereinbefore defined, which also contain 1 or 2 groups of the formula: —SO₂.CH₂CHOH.CH₂X and —B—DH represents the residue of a naphthol may be obtained by acetylating the corresponding naphthol mono- or disulphonic acid, reacting with phosphorus chlorides to form the corresponding mono- or disulphonchloride, treating with sodium sulphite in the presence of sodium hydroxide, reacting the resulting mono- or disulphinic acid with an epihalogenohydrin in the presence of a phosphate buffer and finally heating with an aqueous solution of hydrochloric acid to hydrolyse off the acetyl group.

A preferred class of this class of metallised azo dyestuffs of the invention are the metallised azo dyestuffs, which in the form of the free acids, are represented by the formula:

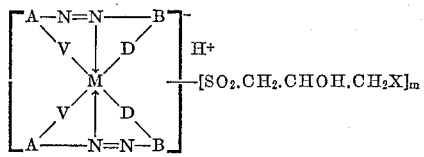

wherein A represents a substituted or unsubstituted arylene radical, B represents the residue of a coupling component which couples in the ortho or vicinal position to D, V represents —O— or —COO, D represents —O— or —NH—, and M, X and m have the meanings stated above, provided that A and B are free from sulphonic and carboxylic acid groups. In this preferred class m preferably represents 2 or 4 and D preferably represents —O—.

A third preferred class of the new dyestuffs of the invention are the metallised azo dyestuffs, which in the form of the free acids, are represented by the formula:

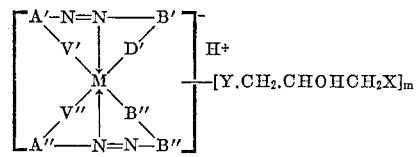

wherein A' and A" each represent substituted or unsubstituted arylene radicals and may be the same or different, B' and B" each represent the residues of substituted or unsubstituted coupling components which couple in the ortho or vicinal positions to D' and D" respectively and B' and B" may be the same or different, V' and V" each represent —O— or —COO— and may be the same or different, D' and D" each represent —O— or —NH— and may be the same or different, M represents a chromium or cobalt atom, X represents a chlorine or a bromine atom, Y represents —O— or —S— and m represents, 1, 2, 3 or 4 provided that each of the groups

is attached directly to a carbon atom present in B' or B"

and that A', A", B' and B" are free from sulphonic and carboxylic acid groups.

The metallised azo dyestuffs of this preferred class may be obtained by treating 1 or 2 different metallisable azo compounds of the formula:

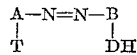

wherein A represents a substituted or unsubstituted arylene radical, B represents the residue of a coupling component which couples in the ortho or vicinal position to D, D represents —O— or —NH— and T represents a hydroxy, carboxy or alkoxy group which is attached to A in the ortho position to the azo link, with an agent or agents yielding chromium or cobalt, the metallisable azo compound or compounds being so chosen that the resulting metallised azo dyestuff contains 1, 2, 3 or 4 groups of the formula: —Y.CH₂CHOH.CH₂X, wherein X and Y have the meanings stated above, and is free from sulphonic and carboxylic acid groups.

The treatment of the metallisable azo compound or compounds with the agent or agents yielding chromium or cobalt can be carried out as described for the preparation of the dyestuffs of the second preferred class.

The said metallisable azo compounds may themselves be obtained by diazotising an amine of the formula:

wherein A and T have the meanings stated above and T is in the ortho position to the —NH₂ group, and coupling the diazo compounds with a coupling component of the formula:

which couples in the ortho or vicinal position to the metallisable group —DH, the amine and coupling component being so chosen that the resulting metallisable azo compounds each contain 0, 1 or 2 groups of the formula: Y.CH₂CHOH.CH₂X wherein X and Y have the meanings stated above, and are free from sulphonic and carboxylic acid groups, other than a carboxylic acid group represented by T.

As examples of amines which may be used to obtain the said metallisable azo compounds there may be mentioned:

o-aminophenol,
4-chloro-2-aminophenol,
6-chloro-2-aminophenol,
4-, 5- or 6-nitro-2-aminophenol,
4:6-dinitro-2-aminophenol,
4-chloro-5-nitro-2-aminophenol,
2-aminophenol-4-sulphonamide,
2-aminophenol-5-sulphonamide,
2-aminophenol-4-sulphon-N-β-hydroxyethylamide,
2-aminophenol-4-sulphondimethylamide,
2-aminophenol-4-sulphonanilide,
2-aminophenol-4-methylsulphone,
2-aminophenol-4-ethylsulphone,
2-aminophenol-4-β-hydroxyethylsulphone,
Anthranilic acid,
4-chloroanthranilic acid,
5-nitroanthranilic acid,
4-sulphamyl-anthranilic acid,
4-methylsulphonyl-anthranilic acid,
4-methoxy-2-aminophenol,
4-methyl-2-aminophenol,
2-aminophenol-4-sulphonmorpholide,
o-anisidine,
4-, 5- or 6-nitro-2-anisidine,
4-, 5- or 6-chloro-2-anisidine,
6-chloro-2-aminophenol-4-sulphonamide,
6-nitro-2-aminophenol-4-sulphonamide,
6-chloro-2-aminophenol-4-methylsulphone, 6-nitro-2-aminophenol-4-methylsulphone,
2-aminophenol-4:6-dimethylsulphone,
1-amino-2-naphthol-4-sulphonamide, and
1-amino-6-nitro-2-naphthol-4-sulphonamide.

As examples of coupling components which may be used to obtain the said metallisable azo compounds there may be mentioned pyrazolones such as 1-phenyl-3-methyl-5-pyrazolone, 1-(2'-, 3'- or 4'-methylphenyl)-3-methyl-5-pyrazolone, 1-(2'-, 3'- or 4'-chlorophenyl)-3-methyl-5-pyrazolone, 1-[4-(γ-chloro-β-hydroxypropoxy) phenyl]-3-methyl-5-pyrazolone, 1-(3'- or 4'-sulphamylphenyl)-3-methyl-5-pyrazolone, 3-methyl-5-pyrazolone, 1-(2'-, 3'- or 4'-nitrophenyl)-3-methyl-5-pyrazolone, 1-(3'- or 4'-N-β-hydroxyethylsulphamylphenyl) - 3 - methyl-5-pyrazolone and 1-(2'-, 3'- or 4'-β-hydroxyethylsulphenyl)-3-methyl-5-pyrazolone, naphthols such as 1-acetylamino-7-naphthol, 1-propionylamino-7-naphthol, 1-benzensulphonylamino-7-napthol, 1 - carbomethoxyamino-7-naphthol, 1-carboethoxyamino-7-naphthol, 2-naphthol, 5-chloro-1-naphthol, 5:8-dichloro-1-naphthol, 2-naphthol-6-sulphon-N-β-hydroxyethylamide, 2-naphthol-6-β-hydroxyethyl sulphone, 4-acetyl-1-naphthol, 2-naphthol-6-sulphonanilide, 2-naphthol-6-sulphon-N-(4'-N-β-hydroxyethylsulphamylphenyl)amide, 6-acetyl-2-napthol, 1-naphthol-3-sulphonamide, 2-naphthol-6-sulphonamide and 1-napthol-5-sulphonamide, acylacetoarylides such as acetoacetanilide, 4-(γ-chloro-β-hydroxypropylmercapto)acetoacetanilide and 4-(γ-chloro-β - hydroxypropoxy)acetoacetanilide, phenols such as 3:4-dimethylphenol, p-cresol, 2- or 3-acetylamino-4-methylphenol, 2-hydroxy-5:6:7:8-tetrahydronaphthalene and 2-hydroxy-3-sulphamyl-5:6:7:8-tetrahydronaphthalene, 2:4 - dihydroxyquinoline, and amine coupling components such as 2-naphthylamine and 2-naphthylamine-6-sulphonamide.

Those coupling components of the formula:

B—H
|
DH as hereinbefore defined, which also contain 1 or 2 groups of the formula: —Y.CH₂CHOH.CH₂X wherein X and Y have the meanings stated above and —B—DH represents the residue of a 5-pyrazolone may be obtained by diazotising the corresponding amine containing 1 or 2 groups of the formula: —Y.CH₂CHOH.CH₂X, reducing the diazo compound so obtained to the hydrazine, condensing the hydrazine with an acylacetic ester such as acetoacetic ester and finally ring closing to form the 5-pyrazolone.

Those coupling components of the formula:

B—H
|
DH as hereinbefore defined, which also contain 1 or 2 groups of the formula: —Y.CH₂CHOH.CH₂X and —B—DH represents the residue of an acetoacetarylide may be obtained by condensing the corresponding amine containing 1 or 2 groups of the formula: —Y.CH₂CHOH.CH₂X with diketene.

Those coupling components of the formula:

B—H
|
DH as hereinbefore defined, which also contain 1 or 2 groups of the formula: —O.CH₂CHOH.CH₂X and —B—DH represents the residue of a naphthol may be obtained by treating the corresponding acetylaminonaphthalene carrying one or two —OH groups with epichlorohydrin or epibromohydrin, hydrolysing the N-acetylamino group to an amino group, and subsequently converting the amino group to a hydroxy group by diazotisation and decomposition of the diazo compound in a hot aqueous solution of an inorganic acid.

The new metallised azo dyestuffs of this preferred class, wherein M represents a chromium atom, may also be obtained by reacting together a metallisable azo compound of the formula:

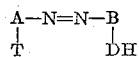

A—N=N—B
|        |
T        DH wherein A, B, D and T have the meanings stated above and a 1:1-chromium complex of the same or different metallisable azo compound, provided that the metallisable azo compound or the 1:1-chromium complex together contain from one to four

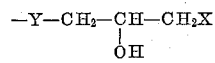

—Y—CH₂—CH—CH₂X
         |
         OH groups, as hereinbefore defined.

This reaction may be conveniently brought about by heating the metallisable azo compound and the 1:1-chromium complex together in a solvent such as water or in a mixture of water and a water-miscible organic liquid such as ethanol, adding sodium chloride and isolating the precipitated dyestuff.

The 1:1-chromium complexes of the metallisable azo compounds may themselves be obtained by heating the metallisable azo compounds with a salt of trivalent chromium, such as chromium trifluoride, in an aqueous medium in the presence of an acid such as formic acid, for example by the methods described in Examples 3 and 4 of British specification No. 699,976.

A preferred class of this class of metallised azo dyestuffs of the invention are the metallised azo dyestuffs, which in the form of the free acids, are represented by the formula:

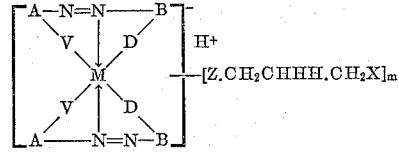

wherein A represents a substituted or unsubstituted arylene radical, B represents the residue of a coupling component which couples in the ortho or vicinal position to D, V represents —O— or —COO, D represents —O— or —NH—, and M, X, Z and m have the meanings stated, provided that A and B are free from sulphonic and carboxylic acid groups. In this preferred class m preferably represents 2 and D preferably represents —O—.

The new dyestuffs may be used for the colouration, by dyeing or printing, of a wide variety of textile materials. Nitrogenous materials such as natural proteins, for example, wool, silk and leather, or synthetics such as nylon or polyacrylonitrile may be dyed, for example, in hot acid, neutral or weekly alkaline aqueous solutions of the dyestuff.

The new water-soluble dyestuffs may be used for the colouration of vegetable and regenerated cellylose fibres such as cotton, linen and viscose rayon, the treatment being carried out in conjunction with a treatment at elevated temperature with an alkali. When so applied the new dyestuffs are believed to react chemically with the fibre, this belief being based on the resistance of the colouration to severe washing treatments and also to solvent extraction treatments. It is believed that the coloured cellulose derivatives so obtained possess the formula:

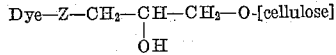

Dye—Z—CH₂—CH—CH₂—O-[cellulose]
              |
              OH

The above treatment may readily be adapted so that it may be carried out in the commercially-available machinery used for dyeing or textile printing processes and for continuous or non-continuous variations of such processes.

Thus the cellulose material may be impregnated with an alkali and with the dyestuff and then subjected to a heating or steaming step in, for example, a hot flue dryer, a molten metal bath, an oven or a stenter.

The impregnation may be carried out, for example, by padding the material in an aqueous solution containing both dyestuff and alkali or, in either order, through aqueous solutions containing separately the dyestuff and the alkali.

Preferably the material is padded in an aqueous solution of the dyestuff and dried by any convenient means and the dried material is padded through an aqueous solution of alkali and then steamed or heated for example at between 100° and 130° C.

The solution of dyestuff may contain adjuvants commonly used in dyeing, for example urea, wetting agents such as the condensation products of fatty alcohols or alkylated phenols with ethylene oxide, sulphonated oils, methylene dinaphthalene sulphonic acid or oleyl sodium sulphate and migration inhibitors such as Glaubers salt, common salt, or sodium alginate.

The solution of alkali, particularly when used in the preferred manner described above, may contain alkaline and neutral electrolytes such as sodium chloride, sodium sulphate and potassium chloride. Preferably, there is used a solution containing at least 0.5% by weight, and preferably between 1% and 3% by weight of a caustic alkali such as caustic soda or caustic potash, since the subsequent fixation of the dyestuff may then be achieved by a relatively short steaming step of between 1 and 5 minutes, thus rendering the process particularly suitable for continuous dyeing. Solutions containing a higher concentration of alkali, for example up to 25 to 30% of alkali, may also be used.

When the alkali is added to the solution of dyestuff, there can be used a non-caustic alkali, to lessen premature hydrolysis of the reactive groups. Preferably an alkali capable of giving a pH of at least 10 in aqueous solution is used, although there may also be used certain milder alkalis, for example alkali metal bicarbonates, which are converted to an alkali capable of giving a pH of at least 10 at the elevated temperature necessary to cause reaction of the cellulose with the dyestuff.

The treatment of the cellulose textile material with the dyestuff and the alkali may also be carried out by textile printing methods, for example by locally treating the textile material with a printing paste containing the dyestuff and an alkali, and thereafter subjecting the printed material to an elevated temperature, for example by a heating or a steaming step. Alternatively, the alkali may be applied in a separate step, before or after printing the material with a printing paste containing the dyestuff.

The printing pastes used may contain the adjuvants commonly used in the formation of textile printing pastes, for example, urea, wetting agents as exemplified above, mild oxidising agents such as sodium m-nitrobenzene sulphonate, and thickening agents. As thickening agents, there may be used, for example, starch, British Gum, Gum Tragacanth, or alkyl ethers of cellulose, but preferably there are used thickening agents free from primary alcoholic hydroxyl groups, for example the emulsion thickeners described in United Kingdom specification No. 524,803, or preferably alginates, especially sodium alginate.

Since these preferred thickening agents are adversely affected by caustic alkalis, it is preferred to use milder alkalis such as sodium carbonate, trisodium phosphate or sodium metasilicate when the alkali is added to the printing paste. As in the dyeing recipes, an alkali capable of giving a pH of at least 10.0 in aqueous solution is necessary, although milder alkalis such as alkali metal bicarbonates which are converted during the heating or steaming step to an alkali as defined above, may be used.

It will be appreciated that any dyestuff which has been absorbed by the cellulose material but which has not reacted with it, will behave as a so-called "direct" dyestuff and will be removable from the coloured cellulose by subsequent washing treatments at a rate which depends upon its affinity for cellulose. It is therefore a preferred feature of the present process to use dyestuffs having poor affinity for cellulose when dyed in the absence of alkali, and to subject the coloured cellulose to a scouring treatment, for example by boiling in a dilute aqueous solution of soap or detergent for at least 1 minute and preferably at least 5 minutes, to remove unreacted dyestuff before finally drying the material.

When the dyestuff used in the coluration process contains suitable groupings, for example diazotisable amino groups, aromatic hydroxyl or keto-enol groups or metallisable systems, the coloured cellulose may be subjected to further treatments, e.g. with nitrous acid and then a coupling component; or with a diazotised amine; or with an agent yielding metal, to modify the shade or properties of the coloured cellulose.

The new colouration process may be applied to a wide variety of cellulose materials, for example textile materials such as loose fibre of cotton and linen, viscose rayon filament and staple fibre, to fabrics woven entirely or partly from such fibres.

The resulting colourations are very fast to washing treatments, and according to the dyestuff residue attached thereto may be fast to light, to bleaching treatments, to treatments with acid and alkali, or to burnt gas fumes. They are thus suitable for the manufacture of textile materials with a high degree of washing fastness for example high quality shirtings and sheetings, and also for furnishing materials.

The new dyestuffs of the invention, and in particular the metallised azo dyestuffs of the invention, are valuable for colouring nitrogen-containing textile materials for example wool and polyamide textile materials. The dyestuffs are preferably applied to the said textile materials from a neutral or slightly acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, benzyl alcohol and n-butanol, non-ionic dispersing agents and surface-active cationic agents.

The metallised azo dyestuffs have excellent affinity for nitrogen-containing textile materials and the dyeings so obtained have excellent fastness to light and to wet treatments such as washing, milling, potting and acid-cross dyeing.

The invention is illustrated but not limited by the following examples in which parts and percentages are by weight:

*Example 1*

4 parts of 4-(3'-chloro-2'-hydroxypropoxy)aniline, obtained as described below, are dissolved in 60 parts of water and 4 parts of aqueous hydrochloric acid of specific gravity 1.16 at 5° C. A solution of 1.4 parts of sodium nitrite in 10 parts of water is added during 10 minutes. The mixture is stirred for 5 minutes and excess nitrous acid is removed by adding sulphamic acid. The diazo compound so obtained is added to a suspension, cooled to 5° C., of 4.78 parts of 2-amino-8-hydroxy-naphthalene-6-sulphonic acid in 60 parts of water and the mixture is stirred for 20 hours at 5° C. 5 parts of sodium bicarbonate are added and then sodium chloride is added at the rate of 150 grams for each litre of mixture. The precipitated dyestuff is filtered off and dried. It is obtained in the form of a brown powder which dissolves readily in water to give a brown solution. The organically combined chlorine content of the product corresponds to 1 atom of chlorine per azo link. The product colours cellulose textile materials in brown shades very fast to washing when applied in conjunction with alkali. A number of suitable recipes are given below in Examples 3 to 6.

The 4-(3'-chloro-2'-hydroxypropoxy)nitrobenzene obtained according to the method described by Stephenson in the Journal of the Chemical Society, 1954, at p. 1571, are dissolved in 370 parts of ethyl alcohol and 10 parts of finely divided nickel are then added. The mixture is then heated at from 40° to 50° C. for 6 hours in an autoclave with hydrogen at 100 atmospheres pressure, and cooled. The suspended nickel is removed by filtration and the resulting alcoholic solution is evaporated to dryness. The residual oil consists of 39 parts of crude 4-(3'-chloro-2'-hydroxypropoxy)aniline which can be purified by recrystallisation of its half-sulphate.

*Example 2*

23 parts of copper phthalocyanine are heated in 240 parts of chlorosulphonic acid at 138° C. for 4 hours, then the solution is cooled and drowned into ice and water. The precipitate, which consists substantially of copper phthalocyanine-tetra-(3')-sulphonchloride, is filtered off, suspended in 400 parts of water, cooled to below 5° C. and the pH of the mixture is brought to 7 by adding sodium carbonate.

A solution of 16.1 parts of 4-(3'-chloro-2'-hydroxypropoxy) aniline in 50 parts of water and 8.1 parts of aqueous hydrochloric acid of specific gravity 1.16 is then added followed by the addition of 34 parts of sodium bicarbonate. The mixture is stirred at below 5° C. for 5 hours and then at 20° C. for 12 hours and the precipitated material is then filtered off and dried.

The product so obtained is a dark blue powder which is soluble in water. The figures obtained on analysis of the product show it to contain at least two sulphonic acid groups and between 1.5 and 2 sulphon (4-(3'-chloro-2'-hydroxypropoxy)anilide) groupings per molecule.

The product colours cellulose textile materials in greenish-blue shades very fast to washing when applied in conjunction with an alkali by the recipes, or simple variations of the recipes, described in Examples 3 to 6.

In place of the 23 parts of copper phthalocyanine used in the above example there are used 22.8 parts of nickel phthalocyanine or 22.8 parts of cobalt phthalocyanine when similar dyestuffs are obtained.

*Example 3*

100 parts of cotton fabric are padded in a 2% aqueous solution of the dyestuff of Example 1 containing 0.2% of a highly sulphonated oil and 2% of sodium sulphate, and squeezed until the weight of the fabric is 200 parts. The fabric is dried, padded in an aqueous solution containing 2% of caustic soda and 30% of sodium chloride and again squeezed until its weight is 200 parts.

The fabric is then steamed for 1 minute at 100° C., then rinsed in water, boiled in a dilute soap solution for five minutes, rinsed again in water and dried.

The fabric is coloured a brown shade, very fast to washing.

*Example 4*

A print paste is prepared having the following composition:

| | Parts |
|---|---|
| Dyestuff of Example 2 | 3.0 |
| Urea | 5.0 |
| Water | 55.5 |
| Sodium alginate (5% aqueous solution) | 35.0 |
| Sodium bicarbonate | 1.5 |
| | 100 |

The paste is applied to a plain weave cotton fabric by means of a roller printing machine. The prints are dried, steamed for 10 minutes at atmospheric pressure, rinsed in cold water, washed in a boiling dilute soap solution for 5 minutes, rinsed and dried.

The greenish-blue prints so obtained have excellent fastness to washing.

*Example 5*

100 parts of viscose rayon yarn are added to a solution at 50° C. containing 1 part of the dyestuff used in Example 1 in 3,000 parts of water and 90 parts of sodium chloride are then added. The solution is then heated to 90° C. and treatment continued at this temperature for 30 minutes. A solution of 5 parts of caustic soda flake in water is then added. After a further 60 minutes the viscose rayon is removed, rinsed in water and finally "soaped" for 15 minutes in a boiling solution containing 9 parts of an alkyl phenolethylene oxide condensate in 3,000 parts of water and it is then rinsed in water and dried. The viscose rayon is dyed a brown shade.

A similar result is obtained if trisodium phosphate is used in place of the caustic soda.

*Example 6*

A length of plain weave cotton fabric is padded with an aqueous solution containing 1% of the dyestuff of Example 2, 2% of sodium carbonate, 20% of urea and 0.2% of a wetting agent consisting of a highly sulphonated oil, and squeezed until the fabric retains only its own weight of solution. The fabric is then heated at a temperature of 125° to 130° C. for 2 minutes, then is rinsed, washed, rinsed and dried as described in Example 3. The fabric is coloured a greenish-blue shade very fast to washing.

*Example 7*

By carrying out the procedure of Example 1 but adding sufficient alkali to give a pH of about 9, a brownish-red dyestuff is obtained.

*Example 8*

4 parts of 4-(3'-chloro-2'-hydroxypropoxy)aniline are diazotised as described in Example 1 and added to a solution of 7.3 parts of 1-acetylamino-8-hydroxynaphthalene-3:6-disulphonic acid and 3.2 parts of sodium bicarbonate in 50 parts of water. The mixture is stirred at 20° C. and at a pH of 8.8 for 1 hour, then sodium chloride is added to precipitate the dyestuff which is filtered off and dried. The red powder so obtained contains 1 atom of organically bound chlorine per azo group. It dyes cellulose by the methods of Examples 3 to 6 in red-violet shades of good fastness to washing.

*Example 9*

16 parts of 4-(3'-chloro-2'-hydroxypropoxy)aniline, half sulphate are dissolved in 60 parts of water and 16 parts of 36% aqueous hydrochloric acid, and diazotised at below 10° C. with a solution of 5.6 parts of sodium nitrite in 80 parts of water, added over 10 minutes. After 5 minutes excess nitrous acid is removed by a small addition of sulphamic acid. The diazo compound so obtained is added during 30 minutes to a solution, cooled to 10° C., of 19.2 parts of 2-amino-5-hydroxynaphthalene-7-sulphonic acid and 13 parts of sodium bicarbonate in 200 parts of water. The mixture is adjusted to pH 7 to 8 by addition of 4 parts of sodium bicarbonate and stirred allowing the temperature to rise to 20° C. After 2 to 3 hours, the pH being in the range 9 to 10, sodium chloride is added and the suspension of slightly trarry precipitated dyestuff is stirred and cooled, to harden. The dyestuff is filtered off, washed on the filter with 10% brine and dried at 40° C.

The reddish-brown powder so obtained contains 1 atom of organically bound chlorine per azo group. It dyes cellulose by the methods of Examples 3 to 6 in dull red shades fast to washing.

By replacing the 19.2 parts of 2-amino-5-hydroxynaphthalene-7-sulphonic acid with 22.5 parts of 2-acetylamino-5-hydroxynapthalene-7-sulphonic acid, or with 27.5 parts of 2 - benzoylamino - 5 - hydroxynaphthalene-7-sulphonic acid, a dyestuff is obtained containing 1 atom of organically combined chlorine per azo group. Each dyes cellulose by the methods of Examples 3 to 6 in red shades fast to washing.

*Example 10*

8 parts of 4-(3'-chloro-2'-hydroxypropoxyaniline) half sulphate are diazotised as described in Example 9. The diazo compound so obtained is added to a solution, cooled to 5° C., of 10.1 parts of the urea of 2-amino-5-hydroxynaphthalene-7-sulphonic acid in 200 parts of water and 6.4 parts of sodium bicarbonate. The mixture is stirred for 18 hours allowing the temperature to rise to 20° C., then sodium chloride is added to coagulate the gelatinous dyestuff suspension. The dyestuff so obtained is filtered off and dried at 40° C.

It is obtained as a reddish powder, containing 1 atom of organically bound chlorine per azo group. It dyes cellulose by the methods of Examples 3 to 6 in strong red shades fast to washing.

*Example 11*

4 parts of 2-(3'-chloro-2'-hydroxypropoxy)aniline are diazotised in the manner described in Example 1. Excess nitrous acid in the diazo solution is removed with sulphamic acid. The diazo solution is added to a suspension, cooled to 5° C., of 4.78 parts of 2-amino-8-hydroxynaphthalene-6-sulphonic acid in 50 parts of water, then 10 parts of sodium acetate crystals are added and the mixture is stirred for 20 hours at 5° C. Sodium chloride is then added and the precipitated dyestuff is filtered off and dried.

It dyes cellulose by the methods of Examples 3 to 6 in brown-red shades of good fastness to washing.

The 2-(3'-chloro-2'-hydroxypropoxy)aniline used in the above example may be obtained and purified in analogous manner to the method described for its para-isomer in Example 1. The sulphate melts at 175° to 176° C.

*Example 12*

By coupling diazotised 2-(3'-chloro-2'-hydroxypropoxy)aniline with 1-acetylamino-8-hydroxynaphthalene-3:6-disulphonic acid in similar manner to the method described in Example 8, a dyestuff is obtained which dyes cellulose by the methods of Examples 3 to 6 in red-violet shades fast to washing.

*Example 13*

If the 4-(3'-chloro-2'-hydroxypropoxy)aniline used in Example 8 is replaced by 3-(3'-chloro-2'-hydroxypropoxy)aniline, a dyestuff is obtained giving a rubine shade fast to washing when applied to cellulose by the methods of Example 3 to 6.

The 3-(3'-chloro-2-hydroxypropoxy)aniline used in the above example may be obtained and purified in analogous manner to the method described for its para-isomer in Example 1. The sulphate melts at 90° to 95° C.

*Example 14*

If the 2-(3'-chloro-2'-hydroxypropoxy)aniline used in Example 11 is replaced by 3-(3'-chloro-2'-hydroxypropoxy)aniline a dyestuff is obtained giving brown-red shades fast to washing when applied to cellulose by the methods of Examples 3 to 6.

*Example 15*

If the 4-(3'-chloro-2'-hydroxypropoxy)aniline used in Example 8 is replaced by 5.04 parts of 1-chloro-3-(m-aminobenzyloxy)-2-propanol hydrochloride, a dyestuff is obtained which gives bluish-red shades when applied to celluose by the methods of Examples 3 to 6.

The 1-chloro-3-(m-aminobenzyloxy)-2-propanol hydrochloride used in this example may be obtained by heating m-nitrobenzyl alcohol with epichlorhydrin the presence of piperidine as catalyst, reducing the product so obtained by catalytic hydrogenation and forming the hydrochloride.

*Example 16*

If the 2-(3'-chloro-2'-hydroxypropoxy)aniline used in Example 8 is replaced by 5.04 parts of 1-chloro-3-(m-aminobenzyloxy)-2-propanol hydrochloride, a dyestuff is obtained which dyes cellulose by the methods of Examples 3 to 6 in dull red shades of good fastness to washing.

*Example 17*

By replacing the 4-(3'-chloro-2'-hydroxypropoxy)aniline used in Example 8 by 5.1 parts of 4-(3'-chloro-2'-hydroxypropylmercapto)aniline hydrochloride, a dyestuff is obtained which dyes cellulose by the methods of Examples 3 to 6 in violet shades of good fastness to washing.

The 4-(3'-chloro-2'-hydroxypropylmercapto)aniline hydrochloride used in the above example may be obtained as follows:

87 parts of p-nitrothiophenol, 1 part of piperidine and 168 parts of epichlorhydrin are stirred in 600 parts of dry toluene at 95° C. for 45 minutes. The toluene is removed by distillation at 15 mm. pressure and the product is dissolved in 175 parts of benzene and is twice precipitated by addition of petroleum. The oil is then dissolved in 350 parts of benzene and the solution is washed with an equal volume of 36% aqueous hydrochloric acid, and then with water until free from acid. The solution is then evaporated to give a yellow solid melting at 41° to 43° C.

65 parts of the product so obtained are dissolved in 325 parts of methanol and hydrogenated at 50° C., 100 atmospheres pressure in the presence of Raney nickel catalyst. The catalyst is filtered off, the methanol is removed by distillation and residual oil is dissolved in chloroform and treated with dry hydrochloric acid. A tar precipitates and this is triturated with ethyl acetate until it solidifies.

*Example 18*

If the 4-(3'-chloro-2'-hydroxypropoxy)aniline used in Example 8 is replaced by 5 parts of 4-(3'-chloro-2'-hydroxypropylsulphonyl)aniline, a dyestuff is obtained which yields dull red shades of good fastness to washing when applied to cellulose by the methods described in Examples 3 to 6.

The 4-(3' - chloro-2'-hydroxypropylsulphonyl)aniline used in this example may be obtained by oxidising 3-(4'-nitrophenylthio)-2-hydroxypropyl chloride with hydrogen peroxide in acetic acid and catalytically reducing the product so obtained in the presence of Raney nickel. It melts at 126° to 128° C.

*Example 19*

If the 2-(3'-chloro-2'-hydroxypropoxy)aniline used in Example 11 is replaced by 5 parts of 4-(3'-chloro-2'-hydroxypropylsulphonyl)aniline, a dyestuff is obtained which dyes cellulose by the methods of Examples 3 to 6 to give red shades of good fastness to washing.

*Example 20*

6.1 parts of 2-aminoaphthalene-1:5-disulphonic acid is stirred with 50 parts of water and 4 parts of aqueous hydrochloric acid of specific gravity 1.16 and diazotised at 5° C. by addition of 1.4 parts of sodium nitrite. After ten minutes the excess nitrous acid is removed with sulphamic acid and the diazo compound is added to a solution at 5° C. of 5.7 parts of 1-[4'-(3''-chloro-2''-hydroxypropoxy)phenyl]-3-methyl-5-pyrazolone in 50 parts of ethylene glycol monomethyl ether, 200 parts of water, 0.8 part of sodium hydroxide and 8 parts of sodium acetate crystals. The mixture is stirred for 1 hour, then sodium chloride is added and the dyestuff which precipitates is filtered off, washed with 5% brine and dried.

The yellow powder so obtained contains one atom of organically bound chlorine per azo group. It dyes cellulose by the methods of Examples 3 to 6 in yellow shades of good fastness to washing.

Example 21 to 28

If in the process of Example 2, the 16.1 parts of 4-(3'-chloro-2'-hydroxypropoxy)aniline are replaced by:

(21) 10.1 parts of 4-(3'-chloro-2'-hydroxypropoxy) aniline,
(22) 17.4 parts of 4-(3'-chloro-2'-hydroxypropylmercapto)aniline,
(23) 10.1 parts of 2-(3'-chloro-2'-hydroxypropoxy) aniline,
(24) 12.1 parts of 2-(3'-chloro-2'-hydroxypropoxy) aniline,
(25) 10.1 parts of 3-(3'-chloro-2'-hydroxypropoxy) aniline,
(26) 12.1 parts of 3-(3'-chloro-2'-hydroxypropoxy) aniline,
(27) 11.8 parts of 1-chloro-3-(m-aminobenzyloxy)-2-propanol, or
(28) 12.9 parts of 1-chloro-3-(m-aminobenzyloxy)-2-propanol dyestuffs are obtained which have, in general, similar properties to those of the dyestuff of Example 2, in that they give greenish-blue shades of good fastness to washing when applied to cellulose by the methods of Examples 3 to 6.

Examples 29 to 36

If, in the process of Example 2, there is used, in place of the copper phthalocyanine-tetra-(3')-sulphonchloride, an equivalent amount of copper phthalocyanine-tetra-(4')-sulphonchloride (obtained by heating copper phthalocyanine-tetra-(4')-sulphonic acid with chlorosulphonic acid at 115° to 120° C. for 4 hours) a dyestuff of similar general properties is obtained.

Similar dyestuffs are also obtained if, in addition to the exchange of copper phthalocyanine-tetra-sulphonchlorides, there is used, in place of the 4-(3'-chloro-2'-hydroxypropoxy)aniline,

(30) 10.1 parts of 4-(3'-chloro-2'-hydroxypropoxy) aniline,
(31) 10.1 parts of 2-(3'-chloro-2'-hydroxypropoxy) aniline,
(32) 12.1 parts of 2-(3'-chloro-2'-hydroxypropoxy) aniline,
(33) 10.1 parts of 3-(3'-chloro-2'-hydroxypropoxy) aniline,
(34) 12.1 parts of 3-(3'-chloro-2'-hydroxypropoxy) aniline,
(35) 11.8 parts of 1-chloro-3-(m-aminobenzyloxy)-2-propanol, or
(36) 12.9 parts of 1-chloro-3-(m-aminobenzyloxy)-2-propanol.

Example 37

46 parts of copper phthalocyanine are chlorosulphonated using the conditions described in Example 2 and the solution is drowned into ice-water, filtered off and washed well with water. The paste so obtained is added during 1-hour to a stirred mixture of 291 parts of sodium bisulphite and 73.6 parts of sodium hydroxide in 1000 parts of water, keeping the pH at from 7.0 to 7.5 by adding 10% aqueous sodium carbonate solution as necessary. 18.5 parts of sodium bicarbonate are added and the mixture is stirred at 20° C. for 18 hours. Sufficient aqueous caustic soda solution is then added to give a pH of 10.5 and the mixture is stirred for 1 hour. The mixture is then acidified to methyl orange and the precipitate is filtered off and dried.

The product so obtained on titration with nitrous acid is found to have one sulphinic acid and 3 sulphonic acid groups in the molecule.

25.6 parts of the product so obtained, containing 17.6 (0.02 mole) of the pure compound are dissolved in 220 parts of water by adding 4% aqueous caustic soda until the pH of the mixture is 6.4. The solution is filtered and a solution of 4.55 parts of disodium hydrogen phosphate and 7.5 parts of sodium dihydrogen phosphate in 40 parts of water is added. 11.4 parts of epichlorhydrin are added and the solution is stirred at 55° to 60° C. for 80 hours. The mixture is made acid to methyl orange and the precipitate is filtered off, washed with acetone and dried.

The product so obtained is found to contain about 1 atom of hydrolysable chlorine (i.e. to contain one

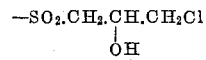

group in the molecule. It dyes cellulose by the methods described in Examples 3 to 6 in greenish-blue shades of good fastness to washing.

Example 38

A solution of 13.95 parts of sodium 1-amino-4-bromoanthraquinone-2-sulphonate in 300 parts of water is added to a stirred mixture of 0.25 part of $CuSO_4 5H_2O$, 0.25 part of $Cu_2Cl_2$ and 22.38 parts of $NaHCO_3$ in 300 parts water. Then 18.0 parts of p-(3'-chloro-2'-hydroxypropoxy) aniline sulphate are added during 10 minutes. The mixture is warmed to 65° C. and stirred for 45 minutes, filtered hot, cooled and 65 parts of salt are added to the cold filtrates. An oil is produced which solidifies on standing for several hours. The solid so obtained is filtered off and purified by dissolving in 750 parts of water at 50° C., filtering and salting the filtrates with 75 parts of salt. This operation is repeated three times and it is then dried.

The product so obtained dyes cellulose in blue shades of good fastness to washing when applied by the methods of Examples 3 to 6.

Example 39

A solution of 7 parts of sodium nitrite in 50 parts of water is added with stirring to a mixture of 28 parts of 2 - amino - 4 - (3' - chloro - 2' - hydroxypropylsulphonyl)anisole, 300 parts of ice, 34.8 parts of a 10 N aqueous solution of hydrochloric acid and 120 parts of water. The mixture is then stirred for a further 10 minutes and the solution so obtained is added during 15 minutes to a solution of 23.4 parts of 2-naphthol-6-sulphonamide and 8 parts of sodium hydroxide in 1200 parts of water, the temperature of the mixture being maintained below 5° C. by external cooling. The mixture is then stirred for 1 hour and the precipitated monoazo compound is filtered off, washed with 50 parts of water and dried.

A mixture of 26 parts of the above monoazo compound, 15 parts of chromium triacetate, 40 parts of water and 400 parts of ethylene glycol is stirred for 5 hours at a temperature between 130° C. and 135° C. The mixture is then cooled to 20° C. and added to 1600 parts of a 10% aqueous solution of sodium chloride. The precipitated dyestuff is then filtered off and washed with a 10% aqueous solution of sodium chloride. The dyestuff so obtained is then purified by dissolving it in 1600 parts of water by the addition of sodium carbonate, the solution so obtained is filtered, 40 parts of sodium chloride are added to the filtrate and the precipitated dyestuff is filtered off and dried.

On analysis the dyestuff so obtained is found to contain 0.87 atom of organically bound chlorine for each azo group present in the dyestuff molecule. When applied to wool from a neutral or slightly acid dyebath the dyestuff yields violet shades possessing excellent fastness to wet treatments.

The 2 - amino - 4 - (3' - chloro - 2' - hydroxypropylsulphonyl)anisole used in the above example may be obtained as follows:

A mixture of 246 parts of o-anisidine, 144 parts of acetic acid and 220 parts of acetic anhydride is stirred at a temperature between 50° and 60° C. for 1 hour. The solution is then cooled to 25° C. and 1864 parts of chlorosulphonic acid are added during 2½ hours, the temperature of the mixture being maintained between 30° and 40° C. by external cooling. The mixture is stirred for 30 minutes at 40° C. and then poured into a mixture of 2000 parts of water and 4000 parts of ice. The precipitated 2 - acetylaminoanisole-4-sulphonchloride is then filtered off and washed with ice-cold water.

The sulphonchloride so obtained is added during 1 hour with stirring to a solution of 310 parts of sodium sulphite in 1550 parts of water, the resulting mixture being maintained alkaline to phenolphthalein by the simultaneous addition of a 35% aqueous solution of sodium hydroxide. The mixture is then stirred for 15 hours at 20° C. 2000 parts of water and 10 parts of active carbon are added, the mixture is filtered and the filtrate is acidified to Congo red with a concentrated aqueous solution of hydrochloric acid. The precipitated 2-acetylaminoanisole-4-sulphinic acid is then filtered off, washed with water and dried.

To a solution of 91.6 parts of the above sulphinic acid and 16.5 parts of sodium hydroxide in 500 parts of water there is added a solution of 57.6 parts of sodium dihydrogen phosphate and 45.6 parts of disodium hydrogen phosphate in 400 parts of water. 37 parts of epichlorohydrin are then added and the mixture is stirred for 20 hours at a temperature of 45° C. A further 9.6 parts of epichlorohydrin are then added and stirring is continued for a further 8 hours at 45° C. The mixture is then cooled to 20° C. and the precipitated 2-acetylamino - 4 - (3' - chloro - 2' - hydroxypropylsulphonyl) anisole is then filtered off, washed with water and dried.

A mixture of 70 parts of the above compound, 300 parts of water and 100 parts of a concentrated aqueous solution of hydrochloric acid is heated for 30 minutes at a temperature between 95° and 100° C. The mixture is then filtered and the filtrate treated with 96 parts of sodium bicarbonate. The precipitated product is then filtered off and dried. The 2 - amino - 4 - (3'-chloro-2'-hydroxypropylsulphonyl)anisole so obtained melts between 105° C. and 107° C.

*Example 40*

A mixture of 4.12 parts of the monoazo compound obtained by coupling diazotised 2-amino-4-(3'-chloro-2'-hydroxypropylsulphonyl)anisole with 3:4-dimethyl phenol in alkaline medium, 2.11 parts of chromium acetate, 170 parts of ethylene glycol and 30 parts of water is stirred for 18 hours at a temperature between 120° and 130° C. The mixture is cooled to 20° C. and is then poured into 400 parts of a saturated aqueous solution of sodium chloride. The precipitated dyestuff is then filtered off, washed with a 5% aqueous solution of sodium chloride and dried.

On analysis the dyestuff is found to contain 1.65 atoms of organically bound chlorine per molecule of dyestuff. When applied to wool from a neutral or slightly acid dyebath the dyestuff yields brown shades possessing excellent fastness to wet treatments and to light.

*Example 41*

In place of the 4.12 parts of the monoazo compound used in Example 40 there are used 4.34 parts of the monoazo compound obtained by coupling diazotised 2-amino-4-(3'-chloro-2'-hydroxypropylsulphonyl)anisole with 2-naphthol in alkaline medium.

When applied to wool from a neutral or slightly acid dyebath the dyestuff yields dull violet shades possessing excellent fastness to wet treatments and to light.

*Example 42*

In place of the 4.12 parts of the monoazo compound used in Example 40 there are used 4.33 parts of the monoazo compound obtained by coupling diazotised 2-amino - 4 - (3' - chloro - 2' - hydroxypropylsulphonyl) anisole with 2-naphthylamine in acid medium. When applied to wool from a neutral or slightly acid dyebath the dyestuff yields olive shades possessing excellent fastness to wet treatments and to light.

*Example 43*

A mixture of 5.33 parts of the monoazo compound obtained by coupling diazotised 6-chloro-2-aminophenol-4-methylsulphone with 6-(3'-chloro-2'-hydroxypropylsulphonyl)-2-naphthol in alkaline medium, 2.11 parts of chromium acetate, 80 parts of ethanol and 100 parts of water is stirred for 3 hours at the boil under a reflux condenser. The mixture is then filtered and the filtrate so obtained is poured into 300 parts of a saturated aqueous solution of sodium chloride. The dyestuff which is precipitated is filtered off, washed with a 5% aqueous solution of sodium chloride and dried. On analysis the dyestuff is found to contain 1.89 atoms of organically bound chlorine per molecule of dyestuff. When applied to wool from a neutral or slightly acid dyebath the dyestuff yields dull violet shades possessing excellent fastness to light and to wet treatments.

The following table gives further examples of the new dyestuffs of the invention which are obtained when the 5.33 parts of the monoazo compound used in Example 43 are replaced by an equivalent amount of the monoazo compound which is obtained by diazotising the amine listed in the second column of the table and coupling with the coupling component listed in the third column of the table. The fourth column of the table indicates the shades obtained when the dyestuffs are applied to wool.

| Example | Amine | Coupling Component | Shade on wool |
|---|---|---|---|
| 44 | 2-amino-4-(3'-chloro-2'-hydroxypropylsulphonyl)phenyl. | 1-(3'-sulphonamidophenyl)-3-methyl-5-pyrazolone. | Orange. |
| 45 | ......do...... | 1-carboethoxyamine-7-naphthol. | Grey. |
| 46 | ......do...... | 1-acetylamine-7-naphthol. | Grey. |
| 47 | ......do...... | 2:4-dihydroxyquinoline. | Red. |
| 48 | Anthranilic acid. | 6-(3'-chloro-2'-hydroxypropylsulphonyl)-2-naphthol. | Red. |

*Example 49*

A mixture of 5.32 parts of the monoazo compound obtained by coupling diazotised 2-aminophenol-4-sulphonamide with 4 - (3' - chloro - 2' - hydroxypropylsulphonyl)acetoacetanilide in alkaline medium, 2.11 parts of chromium acetate, 90 parts of β-ethoxyethanol and 100 parts of water is stirred at the boil under a reflux condenser for 1¼ hours. The mixture is cooled to 20° C., filtered and the filtrate so obtained is poured into 150 parts of a saturated aqueous solution of sodium chloride. The dye stuff which is precipitated is filtered off, washed with a 2% aqueous solution of sodium chloride and dried.

When applied to wool from a neutral or slightly acid dyebath, the dyestuff yields reddish-yellow shades possessing excellent fastness to light and to wet treatments.

*Example 50*

A mixture of 4.65 parts of the monoazo compound obtained by coupling diazotised 4-nitro-2-aminophenol with 6 - (3' - chloro - 2' - hydroxypropylsulphonyl) - 2-naphthol in alkaline medium, 1.74 parts of cobalt acetate, 80 parts of ethanol and 100 parts of water is stirred at the boil under a reflux condenser for 1¾ hours. The mixture is then filtered and the filtrate so obtained is poured into 150 parts of a saturated aqueous solution of sodium chloride. The dye stuff which is precipitated is filtered off, washed with a 5% aqueous solution of sodium chloride and dried.

On analysis the dye stuff is found to contain 1.96 atoms of organically bound chlorine per molecule of dyestuff. When applied to wool from a neutral or slightly acid dyebath the dyestuff yields dull red shades possessing excellent fastness to wet treatments and to light.

The following table gives further examples of the new dyestuffs of the invention when the 4.65 parts of the monoazo compound used in Example 50 are replaced by an equivalent amount of the monoazo compound which is obtained by diazotising the amine listed in the second column of the table and coupling with the coupling component listed in the third column of the table. The fourth column of the table indicates the shades obtained when the deystuffs are applied to wool.

| Example | Amine | Coupling Component | Shade on wool |
|---|---|---|---|
| 51 | 2-amino-4-(3'-chloro-2'-hydroxypropylsulphonyl)phenol. | 4-(3'-chloro-2'-hydroxypropylsulphonyl) acetoacetanilide. | Yellow. |
| 52 | 5-nitro-2-aminophenol. | 1-[4'-(3''-chloro-2''-hydroxypropylsulphonyl)-phenyl]-3-methyl-5-pyrazolone. | Red. |
| 53 | 4-chloro-2-aminophenol. | ___do___ | Orange. |
| 54 | 6-nitro-1-diazo-2-oxide-naphthalene-4-sulphonamide. | ___do___ | Red. |

*Example 55*

A mixture of 4.99 parts of the monoazo compound obtained by coupling diazotised 2-aminophenol-4-sulphonamide with 6-(3-'-chloro-2'-hydroxypropylsulphony)-2-naphthol in alkaline medium, 1.75 parts of cobalt acetate, 80 parts of ethanol and 100 parts of water is stirred at a temperature of 35° C. for 1 hour. The mixture is then filtered and the filtrate so obtained is poured into 150 parts of a saturated aqueous solution of sodium chloride. The dyestuff which is precipitated is then filtered off, washed with a 5% aqueous solution of sodium chloride and dried.

On analysis the product is found to contain 1.57 atoms of organically bound chlorine per molecule of dyestuff. When applied to wool from a neutral or slightly acid dyebath the dyestuff yields bordeaux shade possessing excellent fastness to light and to wet treatments.

The 4 - (3' - chloro - 2' - hydroxypropylsulphonyl)-acetoacetanilide used in the above examples was obtained as follows:

10 parts of epichlorohydrin were added to a mixture of 19.9 parts of p-acetylaminobenzene sulphinic acid, 18.4 parts of sodium dihydrogen phosphate and 14.4 parts of disodium hydrogen phosphate in 230 parts of water at a temperature of 45 °C. The mixture was stirred for 6 hours at this temperature, 5 parts of epichlorohydrin were then added, stirring was continued for a further 3 hours, 5 parts of epichlorohydrin were again added and stirring was continued for a further 6 hours. The mixture was then cooled to 20° C. and the precipitated 4-(3'-chloro-2'-hydroxypropylsulphonyl)acetanilide was filtered off, washed with water and dried.

A mixture of 20 parts of 4-(3'-chloro-2'-hydroxypropylsulphonyl)acetanilide and 200 parts of a 10% aqueous solution of hydrochloric acid was stirred at the boil under a reflux condenser for 1 hour. The resulting solution was cooled to 20° C. and sodium bicarbonate was then added until the mixture was neutral to litmus. The precipitated 4-(3'-chloro-2'-hydroxypropylsulphonyl)aniline was then filtered off, washed with water and dried.

40 parts of diketene were added to a solution of 31 parts of 4-(3'-chloro-2'-hydroxypropylsulphonyl)aniline in a mixture of 25 parts of a concentrated aqueous solution of hydrochloric acid and 500 parts of water, and the resulting mixture was stirred for 18 hours at 20° C. The precipitated solid was then filtered off, washed with water and dried. The 4-(3'-chloro-2'-hydroxysulphonyl)-acetoacetanilide melted at 117° C.

The 6-(3'-chloro-2'-hydroxypropylsulphonyl)-2-naphthol used in the above examples was obtained as follows:

12 parts of epichlorohydrin were added to a mixture of 18.7 parts of sodium dihydrogen phosphate, 37.3 parts of disodium hydrogen phosphate decahydrate, 30 parts of sodium 2-naphthol-6-sulphinate and 130 parts of water at a temperature of 45° C., and the resulting mixture was stirred for 5½ hours at this temperature. 12 parts of epichlorohydrin were then added and the mixture stirred for 16 hours at 45° C. The precipitated 6-(3'-chloro-2'-hydroxypropylsulphonyl)-2-naphthol was then filtered off, washed with water and dried.

The 2-amino-4-(3'-chloro-2'-hydroxypropylsulphonyl)-phenol used in the above examples was obtained, in the form of the hydrochloride, as follows:

38 parts of epichlorohydrin were added to a solution of 113.6 parts of the disodium salt of 3-nitro-4-hydroxybenzene sulphinic acid (which was obtained by reacting 3-nitro-4-hydroxybenzene sulphonyl chloride with an aqueous solution of sodium sulphite), 50 parts of sodium dihydrogen phosphate and 40 parts of disodium hydrogen phosphate in 780 parts of water at a temperature of 45° C., and the resulting mixture was stirred for 6 hours at this temperature. 20 parts of epichlorohydrin were then added and the mixture stirred for a further 15 hours. 1000 parts of water and 80 parts of a concentrated aqueous solution of hydrochloric acid were then added and the precipitated solid was filtered off, washed with water and dried. After crystallisation from ethanol the 4-(3'-chloro-2' - hydroxypropylsulphonyl) - 2 - nitrophenol melted at 130° to 132° C.

30 parts of 4-(3'-chloro-2'-hydroxypropylsulphonyl)-2-nitrophenol were dissolved in 400 parts of ethanol, 30 parts of Raney nickel catalyst were added and the mixture was stirred for 2 hours in an autoclave at a temperature of 50° C. and in the presence of hydrogen at 50 atmospheres pressure. The mixture was then filtered, 15 parts of a concentrated aqueous solution of hydrochloric acid were added to the filtrate, and the solution was then evaporated to dryness in a vacuum. The residual solid was the hydrochloride of 4-(3'-chloro-2'-hydroxypropylsulphonyl)-2-aminophenol.

The 1-[4'-(3''-chloro - 2'' - hydroxypropylsulphonyl)-phenyl]-3-methyl-5-pyrazolone used in the above examples was obtained as follows:

21 parts of sodium nitrite were added to a solution of 69.0 parts of 4-(3'-chloro-2'-hydroxypropylsulphonyl)-aniline in the mixture of 150 parts of water and 75 parts of a concentrated aqueous solution of hydrochloric acid, the temperature being maintained between 0° and 5° C. by external cooling. 40 parts of sodium acetate crystals were then added and the resulting mixture was then added to a mixture of 252 parts of a 37% aqueous solution of sodium bisulphite and 22 parts of a 40% aqueous solution of sodium hydroxide, the temperature being maintained between 0° and 5° C. by the addition of ice. The mixture was then stirred for 2 hours at 5° C. and finally for 3 hours at 75° C. 125 parts of a concentrated aqueous solution of hydrochloric acid were then added and the mixture stirred for 2½ hours at 95° C. The mixture was cooled to 5° C. and a 40% aqueous solution of sodium hydroxide was then added until the mixture was just acid to Congo red, the temperature of the mixture being maintained between 5° and 10° C. by external cooling. An aqueous solution containing 30 parts of acetoacetamide was added and the resulting mixture was stirred for 1 hour at 30° C. The precipitated 1-[4'-(3''-chloro-2'' - hydroxypropylsulphonyl)phenyl]-3-methyl-5-pyrazolone was then filtered off, washed with water and dried.

*Example 56*

A mixture of the monoazo compound obtained by diazotising 1.88 parts of 2-aminophenol-4-sulphonamide and coupling with 3.1 parts of 1-[4'-(3''-chloro-2''-hydroxypropoxy)phenyl]-3-methyl-5-pyrazolone in alkaline medium, 1.98 parts of chromium acetate, 120 parts of ethanol and 150 parts of water is stirred for 5½ hours at the boil under a reflux condenser. The mixture is cooled to 20° C. and is then poured into 350 parts of a saturated aqueous solution of sodium chloride. The dyestuff which is precipitated is filtered off, washed with a 5% aqueous solution of sodium chloride and dried. On analysis the dyestuff is found to contain 1.97 atoms of organically bound chlorine per molecule of dyestuff. When applied to wool from a neutral or slightly acid dyebath the dyestuff yields orange shades possessing excellent fastness to light and to wet treatments.

The 1 - [4'-(3''-chloro-2''-hydroxypropoxy)phenyl]-3-methyl-5-pyrazolone used in the above example may be obtained by diazotising 4-(3'-chloro-2'-hydroxypropoxy)-aniline, reducing the resulting diazo compound to the hydrazine sulphonate by treating with sodium bisulphite and then with zinc dust in the presence of acetic acid, hydrolysing the hydrazine sulphonate by heating with a mixture of ethanol and an aqueous solution of hydrochloric acid, and finally condensing the resulting hydrazine hydrochloride with acetoacetamide.

*Example 57*

A mixture of the monoazo compound obtained by diazotising 1.8 parts of anthranilic acid-5-sulphonamide and coupling with 2.57 parts of 1-[4'-(3''-chloro-2''-hydroxypropoxy)-phenyl]-3-methyl-5-pyrazolone in alkaline medium, 1.65 parts of chromium acetate, 80 parts of ethanol and 100 parts of water is stirred at the boil under a reflux condenser for 10 hours. The mixture is cooled to 20° C., filtered and the filtrate so obtained is poured into 400 parts of a saturated aqueous solution of sodium chloride. The dyestuff which is precipitated is filtered off, washed with a 5% aqueous solution of sodium chloride and dried.

When applied to wool from a neutral or slightly acid dyebath, the dyestuff yields reddish-yellow shades possessing excellent fastness to light and to wet treatments.

*Example 58*

A mixture of the monoazo compound obtained by diazotising 1.88 parts of 2-aminophenol-4-sulphonamide and coupling with 3.10 parts of 1-[4'-(3''-chloro-2''-hydroxypropoxy)phenyl]-3-methyl-5-pyrazolone in alkaline medium, 1.74 parts of cobalt acetate, 120 parts of ethanol and 150 parts of water is stirred at the boil under a reflux condenser for ¾ hour. The mixture is cooled to 20° C. and is then poured into 550 parts of a saturated aqueous solution of sodium chloride. The mixture is allowed to stand for 24 hours and the dyestuff which is precipitated is then filtered off, washed with a 5% aqueous solution of sodium chloride and dried.

On analysis the dyestuff is found to contain 1.98 atoms of organically bound chlorine per molecule of dyestuff. When applied to wool from a neutral or slightly acid dyebath the dyestuff yields reddish-yellow shades possessing excellent fastness to wet treatments and to light.

*Example 59*

In place of the 18.0 parts of p-(3'-chloro-2'-hydroxypropoxy)aniline sulphate used in Example 38 there are used 17.6 parts of p-(3'-chloro-2'-hydroxypropylthio)-aniline hydrochloride and instead of stirring the mixture for 45 minutes at 65° C., the mixture is stirred for 9 hours at 65° C. whereby a dyestuff is obtained which dyes cellulose textile materials in blue shades possessing very good fastness to wet treatments.

*Example 60*

3.4 parts of epichlorohydrin are added to a solution of 10.5 parts of the sodium salt of copper phthalocyanine-3-sulphon-N-β-hydroxyethylamide sulphonic acid (which is obtained as described in Example 8 of British specification No. 826,689) in 47 parts of water. A solution of 0.72 part of sodium hydroxide in 18 parts of water is then added and the mixture is stirred for 18 hours at a temperature between 20° and 25° C. 1.7 parts of epichlorohydrin and a solution of 0.72 part of sodium hydroxide in 18 parts of water are then added and the mixture is stirred for a further 24 hours at 20° C. The resulting mixture is then poured into 118 parts of a concentrated aqueous solution of hydrochloric acid and the precipitated dyestuff is filtered off and dried.

On analysis the dyestuff is found to contain 1.4 atoms of organically bound chlorine per molecule of dyestuff. When applied to cellulose textile materials in conjunction with an acid-binding agent the dyestuff yields greenish-blue shades possessing excellent fastness to wet treatments.

In place of the 3.4 and 1.7 parts of epichlorohydrin used in the above example there are used 5.2 parts and 2.6 parts respectively of epibromohydrin when a similar dyestuff is obtained.

In place of the 10.5 parts of the sodium salt of copper phthalocyanine - 3 - sulphon-N-β-hydroxyethylamide sulphonic acid used in the above example there are used equivalent amounts of the sodium salt of 3-(4'-carboxy-3'-hydroxyphenyloxysulphonyl)-copper phthalocyanine-3-sulphonic acid (which may be obtained as described in Example 2 of British specification No. 768,444) or the sodium salt of N:N-bis(β-hydroxyethyl)-aminomethyl-copper phthalocyanine sulphonic acid (which may be obtained by reacting chloromethyl copper phthalocyanine sulphonic acid with diethanolamine) or the sodium salt of β-hydroxyethylmercaptomethyl copper phthalocyanine sulphonic acid (which may be obtained by reacting chloromethyl copper phthalocyanine sulphonic acid with thiourea, hydrolysing with alkali and finally condensing with ethylene chlorohydrin) or the sodium salt of 4-hydroxy-3-methyl-5-sulphobenzyl copper phthalocyanine (which may be obtained by condensing chloromethyl copper phthalocyanine with o-cresol in the presence of zinc chloride and sulphonating the resulting product) or the sodium salt of copper phthalocyanine-3-sulphon-N-(3'-carboxymethoxy - 4' - hydroxyphenyl)amide-sulphonic acid (which may be obtained by condensing copper phthalocyanine tetra-3-sulphonchloride with 3-amino-6-hydroxyphenoxyacetic acid) or the sodium salt of copper phthalocyanine - 4 - sulphon - N - (4'-hydroxy-3'-sulphophenyl)-amide-sulphonic acid (which may be obtained by condensing copper phthalocyanine-tetra - 4 - sulphonchloride with 4-aminophenol-2-sulphonic acid in aqueous medium in the presence of sodium carbonate) or the sodium salt of mercaptomethyl copper phthalocyanine sulphonic acid when similar dyestuffs are obtained.

*Example 61*

In place of the solution of 16.1 parts of 4-(3'-chloro-2'-hydroxypropoxy)aniline in 50 parts of water and 8.1 parts of aqueous hydrochloric acid of specific gravity 1.16 used in Example 2 there is used a solution of 24.2 parts of the sodium salt of 4-(3'-chloro-2'-hydroxypropoxy)aniline-3-sulphonic acid in 100 parts of water when a similar dyestuff is obtained.

The sodium salt of 4-(3'-chloro-2'-hydroxypropoxy)-aniline-3-sulphonic acid used in the above example may be obtained by condensing the sodium salt of 4-hydroxy-acetanilide-3-sulphonic acid with epichlorohydrin and subsequently hydrolysing off the N-acetyl group.

*Example 62*

22.4 parts of copper phthalocyanine-3:4':4'':4'''-tetra-sulphonic acid are added to 238 parts of chlorosulphonic acid and the resulting mixture is stirred for 4 hours at a temperature between 135° and 140° C. The mixture is cooled to 10° C. and is then poured on to ice. The precipitated copper phthalocyanine tetrasulphonchloride is then filtered off and washed with cold water. The resulting solid is stirred in 500 parts of water at a temperature of 1° C. and 16.8 parts of sodium bicarbonate and 7.5 parts of γ-chloro-β-hydroxypropoxyaniline ½ sulphate are added. The mixture is then stirred for 24 hours at 15° C., 100 parts of sodium chloride are added and the precipitated dyestuff is filtered off and dried.

On analysis the dyestuff is found to contain 1.2 atoms of organically bound chlorine per molecule of dyestuff. When applied to cellulose textile materials in conjunction with a treatment with an acid-binding agent the dyestuff yields greenish-blue shades possessing excellent fastness to wet treatments.

*Example 63*

In place of the 4 parts of 4-(3'-chloro-2'-hydroxypropoxy)aniline used in Example 1 there are used 4.36 parts of 4-(3'-chloro-2'-hydroxypropylthio)aniline when a similar dyestuff is obtained.

*Example 64*

A mixture of the monazo compound obtained by diazotising 1.43 parts of 4-chloro-2-aminophenol and coupling with 3.31 parts of 4-(3'-chloro-2'-hydroxypropylthio)-acetoacetanilide in alkaline medium, 1.37 parts of cobalt acetate, 140 parts of β-ethoxyethanol and 100 parts of water is stirred at the boil under a reflux condenser for 5½ hours. The mixture is cooled to 20° C., filtered and the resulting filtrate is poured into 1000 parts of a saturated aqueous solution of sodium chloride. The precipitated dyestuff is then filtered off, washed with a 5% aqueous solution of sodium chloride and dried. On analysis the dyestuff so obtained is found to contain 1.79 atoms of organically bound chlorine per molecule of dyestuff.

When applied to wool the dyestuff yields yellow shades which possess excellent fastness to light and to wet treatments.

In place of the monazo compound used in the above example there are used equivalent amounts of the monoazo compounds obtained by coupling (a) diazotised 5-nitro-2-aminophenol with 4-(3'-chloro-2'-hydroxypropylthio)acetoacetanilide, (b) diazotised 6-nitro-2-aminophenol-4-methylsulphone with 4-(3'-chloro-2'-hydroxypropoxy)acetoacetanilide, (c) diazotised 2-aminophenol-4-sulphon(N-methyl-N-β-hydroxyethyl)amide with 4-(3'-chloro-2'-hydroxypropoxy)acetoacetanilide, and (d) the diazo oxide of 6-nitro-1-amino-2-naphthol-4-sulphonamide with 1-[4' - (3" - chloro - 2" - hydroxypropoxy)phenyl]-3-methyl-5-pyrazolone when dyestuffs are obtained which dye wool in red, orange, yellow and reddish-brown shades respectively which possess excellent fastness to light and to wet treatments.

The 4-(3'-chloro-2' - hydroxypropoxy)acetoacetanilide and 4-(3' - chloro-2'-hydroxypropylthio)acetoacetanilide used in the above examples may be obtained by reacting 4-(3'-chloro-2'-hydroxypropoxy)aniline and 4-(3'-chloro-2'-hydroxypropylthio)aniline respectively with diketene.

*Example 65*

A mixture of the monoazo compound obtained by diazotising 1.88 parts of 2-aminophenol-5-sulphonamide and coupling with 3.14 parts of 4-(3'-chloro-2'-hydroxypropoxy)acetoacetanilide, 1.56 parts of chromium acetate, 90 parts of β-ethoxyethanol and 100 parts of water is stirred at the boil under a reflux condenser for 10½ hours. The mixture is cooled to 20° C., filtered and the resulting filtrate is poured into 1000 parts of a saturated aqueous solution of sodium chloride. The precipitated dyestuff is then filtered off, washed with a 5% aqueous solution of sodium chloride and dried. On analysis the dyestuff is found to contain 1.8 atoms of organically bound chlorine per molecule of dyestuff.

When applied to wool the dyestuff yields reddish yellow shades possessing excellent fastness to light and to wet treatments.

*Example 66*

0.88 part of the 1:1-chromium complex of 1-(2'-hydroxy-5'-nitrophenylazo)-2-naphthylamine are stirred in a mixture of 80 parts of ethanol and 50 parts of water and sodium carbonate is then added until the pH of the mixture is 7. The resulting mixture is then added, during 15 minutes, to a solution of 0.95 part of 1-[4'-(3"-chloro - 2" - hydroxypropoxy)phenyl] - 3-methyl-4-(2"-carboxyphenylazo)-5-pyrrazolone in a mixture of 40 parts of ethanol and 50 parts of water at a temperature of 75° C. The resulting mixture is then stirred at the boil under a reflux condenser for 1 hour. 90 parts of β-ethoxyethanol are then added and the mixture is stirred at the boil under a reflux condenser for a further 3 hours. The mixture is cooled to 20° C., filtered and the filtrate so obtained is poured into 1200 parts of a saturated aqueous solution of sodium chloride. The precipitated dyestuff is then filtered off, washed with a 5% aqueous solution of sodium chloride and dried.

When applied to wool the dyestuff yields green shades possessing excellent fastness to light and to wet treatments.

The 1:1 chromium complex used in the above example may be obtained by stirring a mixture of 15.4 parts of 1-(2'-hydroxy-5'-nitrophenylazo)-2-naphthylamine, 28.3 parts of chromium acetate, 560 parts of ethylene glycol and 70 parts of water at the boil under a reflux condenser for 24 hours, adding 85 parts of a 2 N aqueous solution of hydrochloric acid and stirring at the boil under a reflux condenser for a further 24 hours, filtering the mixture, pouring the filtrate into 2000 parts of a saturated aqueous solution of sodium chloride and filtering off and drying the precipitated 1:1-chromium complex.

*Example 67*

A mixture of 4.35 parts of sodium 1-iodoanthraquinone-2-sulphonate, 5.04 parts of 4-(3'-chloro-2'-hydroxypropoxy)-aniline, 0.2 part of copper sulphate pentahydrate, 7.5 parts of sodium bicarbonate and 100 parts of water is stirred for 3½ hours at a temperature between 30° and 35° C. 250 parts of water are then added and the mixture is filtered. 35 parts of sodium chloride are added to the resulting filtrate and the precipitated dyestuff is filtered off. The dyestuff is dissolved in 500 parts of water, the solution filtered, 35 parts of sodium chloride are added to the filtrate and the precipitated dyestuff is filtered off and dried.

When applied to cellulose textile materials in conjunction with a treatment with an acid-binding agent the dyestuff yields reddish-violet shades which possess good fastness to wet treatments.

*Example 68*

A mixture of 4.1 parts of 1:4-di(4'-phenoxyanilino)-anthraquinone and 71 parts of chlorosulphonic acid are stirred for 20 hours at 18° C. and then for 1 hour at 70° C., and the mixture is then cooled and poured into a mixture of 250 parts of ice, 50 parts of sodium chloride and 250 parts of water. The precipitated solid is then filtered off and washed with a 10% aqueous solution of sodium chloride. The solid is then added to a stirred solution of 3 parts of 4-(3'-chloro-2'-hydroxypropoxy)aniline in a mixture of 100 parts of water and 150 parts of acetone at a temperature of 5° C. 20 parts of a 10% aqueous solution of sodium carbonate are then added and the mixture is stirred for 18 hours at 20° C. 10 parts of sodium chloride are then added and the precipitated dyestuff is filtered off, washed with a 5% aqueous solution of sodium chloride and dried.

When applied to cellulose textile materials the dyestuff yields green shades which possess good fastness to wet treatments.

*Example 69*

A mixture of 4 parts of 1-amino-2-phenoxy-4-anilino-anthraquinone and 70 parts of chlorosulphonic acid is stirred for 20 hours at 18° C. and the mixture is then poured into a mixture of 250 parts of ice, 250 parts of water and 50 parts of sodium chloride. The precipitated solid is then filtered off and washed with a cold 10% aqueous solution of sodium chloride. The resulting solid is then added to a solution of 2.1 parts of 4-(3'-chloro-2'-hydroxypropoxy)aniline in a mixture of 100 parts of water and 100 parts of acetone. 10 parts of a 10% aqueous solution of sodium carbonate are then added and the mixture is stirred for 18 hours at 20° C. 10 parts of sodium chloride are then added and the precipitated dyestuff is filtered off, washed with a 5% aqueous solution of sodium chloride and dried.

When applied to cellulose textile materials in conjunction with a treatment with an acid-binding agent the dyestuff yields violet shades which possess very good fastness to wet treatments.

*Example 70*

A mixture of 12 parts of epichlorohydrin, 17.2 parts of the sodium salt of 1-amino-4-(4'-hydroxyanilino)anthraquinone-2-sulphonic acid, 1.6 parts of sodium hydroxide and 120 parts of water is stirred for 22 hours at 20° C. The resulting solution is then poured into 500 parts of a 5% aqueous solution of sodium chloride and the precipitated dyestuff is then filtered off, washed with a 5% aqueous solution of sodium chloride and dried.

When applied to cellulose textile materials in conjunction with a treatment with an acid-binding agent the dyestuff yields blue shades which possess very good fastness to wet treatments.

*Example 71*

2.01 parts of 4-(3'-chloro-2'-hydroxypropoxy)aniline are diazotised by the method described in the first 6 lines of Example 1 and the diazo compound so obtained is added, with stirring, to a solution of 5.33 parts of the sodium salt of 1-amino-4-(3'-aminoanilino)anthraquinone-2:5-disulphonic acid and 10 parts of sodium bicarbonate in a mixture of 250 parts of water and 100 parts of acetone at a temperature of 5° C. The resulting mixture is stirred for 2 hours at 5° C., 25 parts of sodium chloride are added and the precipitated dyestuff is filtered off. The dyestuff is dissolved in 500 parts of water, the solution is filtered, 15 parts of sodium chloride are added to the filtrates and the precipitated dyestuff is then filtered off and dried.

When applied to cellulose textile materials in conjunction with a treatment with an acid-binding agent the dyestuff yields olive-green shades which possess very good fasteness to wet treatments.

*Example 72*

4 parts of 4-(3'-chloro-2'-hydroxypropoxy)aniline are diazotised by the method described in the first 6 lines of Example 1 and the aqueous solution of the diazo compound is added to a solution of 3 parts of cresidine in a mixture of 20 parts of water and 3 parts of a concentrated aqueous solution of hydrochloric acid at a temperature of 5° C. Sodium acetate is added until the mixture is no longer acid to Congo red, and the mixture is then stirred for 18 hours at 10° C. The precipitated aminoazo compound is then filtered off, washed with 50 parts of ethanol, and dried. The resulting solid is stirred in a mixture of 30 parts of water and 3 parts of a concentrated aqueous solution of hydrochloric acid at 5° C., and 10 parts of a 2 N aqueous solution of sodium nitrite are added. The mixture is stirred for 1 hour at 5° C., and sulphamic acid is added to destroy any free nitrous acid present. The mixture is then added to a solution of 8 parts of 1-acetyl-amino-8-naphthol-3:6-disulphonic acid and 4 parts of sodium carbonate in 40 parts of water, sodium carbonate being added to maintain the mixture just alkaline to litmus. The mixture is stirred for 18 hours at 10° C., 5 parts of sodium chloride are then added and the precipitated dyestuff is filtered off and dried.

When applied to cellulose textile materials in conjunction with a treatment with an acid-binding agent the dyestuff yields blue shades which possess good fastness to wet treatments.

This application is a continuation-in-part application of our application Serial No. 812,146, now abandoned, and Serial No. 40,513, now abandoned.

What we claim is:

Water-soluble dyestuffs of the copper phthalocyanine series containing from 2 to 3 sulphonic acid groups and from 2 to 1 (3'-chloro-2'-hydroxypropoxyphenyl)sulphamyl groups attached to the benz rings of the phthalocyanine nucleus.

References Cited in the file of this patent
UNITED STATES PATENTS

| | | |
|---|---|---|
| 1,935,657 | Mosby et al. | Nov. 21, 1933 |
| 2,083,308 | Senn | June 8, 1937 |
| 2,111,300 | Senn | Mar. 15, 1938 |
| 2,131,712 | Schoeller et al. | Sept. 27, 1938 |
| 2,309,176 | Dreyfus | Jan. 26, 1943 |
| 2,364,033 | Woodward | Nov. 28, 1944 |
| 2,944,870 | Atkinson et al. | July 12, 1960 |
| 3,009,920 | Jaeger et al. | Nov. 21, 1961 |

FOREIGN PATENTS

| | | |
|---|---|---|
| 15,068 | Great Britain | July 27, 1911 |
| 478,514 | Great Britain | Jan. 17, 1938 |
| 1,213,093 | France | Oct. 26, 1959 |
| 1,228,545 | France | Aug. 31, 1960 |

OTHER REFERENCES

Wegmann: "Textile-Praxis," pp. 1056–1061, October 1958.